United States Patent [19]

Skelton

[11] Patent Number: 4,686,431
[45] Date of Patent: Aug. 11, 1987

[54] LINE OUTPUT CIRCUIT FOR GENERATING A LINE FREQUENCY SAWTOOTH CURRENT

[75] Inventor: Dennis C. F. Skelton, Wallington, England

[73] Assignee: U.S. Philips Corporation, New York, N.Y.

[21] Appl. No.: 788,181

[22] Filed: Oct. 16, 1985

[30] Foreign Application Priority Data

Oct. 19, 1984 [GB] United Kingdom ............... 8426422

[51] Int. Cl.$^4$ ............................................ H01J 29/70
[52] U.S. Cl. .................................. 315/399; 315/411; 315/408
[58] Field of Search ...................... 315/399, 411, 408

[56] References Cited

U.S. PATENT DOCUMENTS

| 2,702,874 | 2/1955 | Adler | 315/399 |
| 2,871,405 | 1/1959 | Vonderschmitt | 315/399 |
| 3,769,542 | 10/1973 | Pieters | 315/399 |
| 3,906,303 | 9/1975 | Gerritsen | 315/399 |
| 4,144,479 | 3/1979 | Farina et al. | 315/399 |
| 4,334,173 | 6/1982 | Gabriel et al. | 315/399 |

FOREIGN PATENT DOCUMENTS

| 184222 | 12/1955 | Fed. Rep. of Germany . |
| 957952 | 2/1957 | Fed. Rep. of Germany . |
| 3004572 | 8/1981 | Fed. Rep. of Germany . |
| 690122 | 4/1953 | United Kingdom . |
| 723510 | 2/1955 | United Kingdom . |
| 1251355 | 10/1971 | United Kingdom . |

Primary Examiner—Theodore M. Blum
Assistant Examiner—David Cain
Attorney, Agent, or Firm—Thomas A. Briody; William J. Streeter; Gregory P. Gadson

[57] ABSTRACT

A line deflection circuit in which a transistor (TR) conducts during the scan period to produce a sawtooth current though the line deflection coil (Ly), transistor (TR) being rendered non-conducting at the scan period to initiate the flyback period which may be required to be short (of the order of 6 microseconds). During flyback the circuit is tuned to produce a half sinewave which determines the flyback period and to an odd harmonic (3rd or 5th) of the fundamental for the flyback period. A change in inductance of the width control inductor (L1) will produce a change in the flyback period while a simultaneous change in the inductance of the inductor (L2) will produce a change in the leakage inductance of the transformer (T) to change the frequency of the desired odd harmonic to ensure that the odd harmonic has the desired relationship with the flyback period. Overcomes display modulation that would otherwise be produced.

5 Claims, 8 Drawing Figures

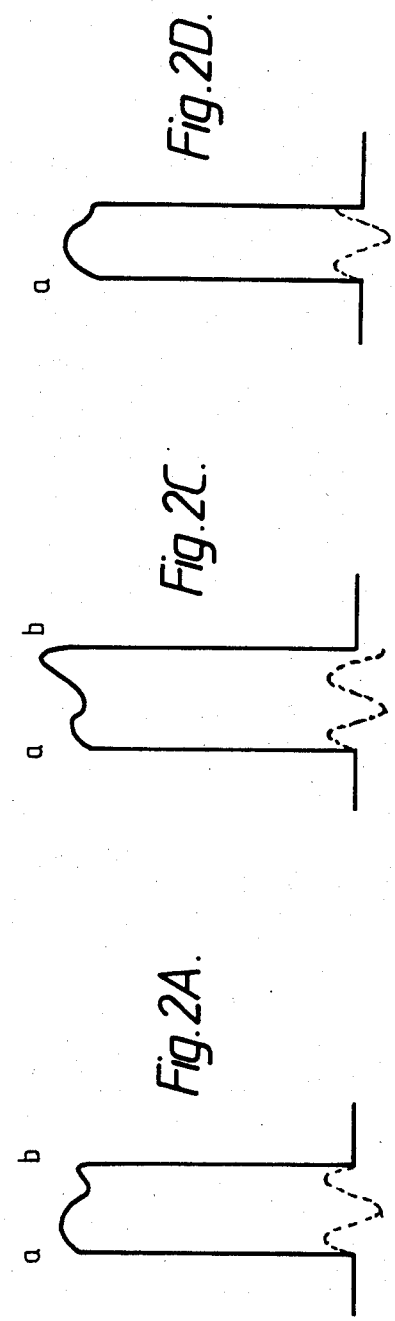
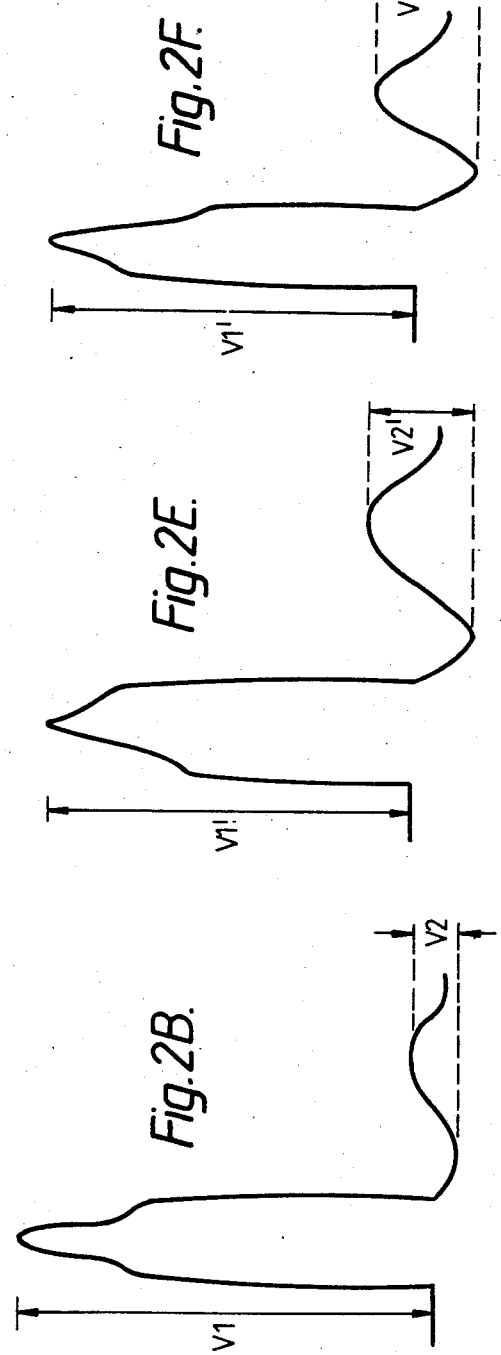

LINE OUTPUT CIRCUIT FOR GENERATING A LINE FREQUENCY SAWTOOTH CURRENT

BACKGROUND OF THE INVENTION

1. Field of the Invention

The invention provides a line output circuit for generating a line frequency sawtooth current having a scan period and a flyback period through a line deflection coil for deflecting an electron beam in a cathode ray display tube, said circuit comprising the series arrangement of a line deflection coil and a trace capacitor which series arrangement is connected across the terminals of a controlled switch, a flyback capacitor also being connected across the terminals of said controlled switch, one terminal of the controlled switch being additionally connected to the primary winding of a transformer which winding is additionally connected to a supply terminal for a source of direct voltage, said transformer having a secondary winding one end of which is connected to a rectifier for generating, during the flyback period, the high voltage (EHT) supply for the final anode of a display tube, the circuit being tuned during the flyback period to a fundamental frequency and an odd harmonic thereof with the flyback period substantially corresponding to the duration of a half-cycle at the fundamental frequency, said controlled switch being conducting during the scan period and being rendered non-conducting at the end of the scan period to initiate the flyback period.

DESCRIPTION OF THE RELATED ART

Such a line output circuit is known from United Kingdon Patent Specifications Nos. 723 510 and 251 355. In practise the odd harmonic to which the circuit is tuned during the flyback period is normally the third harmonic though other harmonics, such as the fifth or seventh, may be used. The above two patent specifications in general relates to line output circuits used in domestic television receivers where the line frequency is of the order of 15 kHz. When such a circuit is used in a data graphics display (DGD) operating at line frequencies of 15 kHz and above with a flyback period of 6 to 8 microsecons it has been found that the flyback period must be retained with reasonable accuracy otherwise the regulation of the EHT will worsen and the ringing produced during the initial part of the scan period, which should be kept typically to less than 15% of the peak-to-peak value during the flyback period, will cause vertical bars to be visible on the side of the display at which line scan is initiated.

SUMMARY OF THE INVENTION

It is an object of the present invention to overcome the above deficiencies.

The present invention provides a line output circuit of the foregoing type which is characterised in that said circuit additionally comprises a first variable inductor included in said series arrangement for varying the width of the line scan on display and a second variable inductor connected in series with a winding of said transformer, the adjustment providing a variation in the inductance of said first inductor being ganged with that for the second inductor whereby any alteration in the desired relationship between the said odd harmonic and the flyback period produced by a change in the inductance of said first inductor is substantially compensated for by the simultaneous change in the inductance of said second inductor.

The present invention stems from the realisation that with such line deflection circuits it was necessary to include a variable width control inductor in series with the line deflection coil not only to take up tolerances in the line deflection coil but also to allow the display width to be adjusted so that either edge-to-edge scan or under or over scan may be achieved depending on the display requirements. It was found that the changes in inductance produced when the width control inductor was adjusted caused a variation of the inductance appearing at the primary side of the transformer so altering the duration of the flyback period and the tuning for the desired odd harmonic which now had the incorrect frequency. At the same time this also produced a fall in the EHT supply produced from the secondary winding which tended to offset the effect of the width control inductor. This was overcome by the inclusion of the second variable inductor whose adjustment was linked to that of the width control inductor to produce the required compensation and maintain the tuning to the required odd harmonic despite changes in the duration of the flyback period. It is appreciated that the width might be adjusted by an active circuit which modulates the amount of deflection current supplied to the line deflection coil but such an active circuit would be expensive compared with the provision of a width control inductor and a compensating inductor both of which may be wound on the same former which although they are not magnetically coupled enables them to be simultaneously adjusted both in one operation.

The second inductor may be connected between the said secondary winding of the transformer and either a point of reference potential or a tap on another winding on said transformer, the first and second inductors being arranged such that as the inductance of the first inductor is increased the inductance of the second inductor is also increased and vice versa, a variation in the inductance of the second inductor varying the leakage inductance of the transformer, a change in the inductance of the first inductor producing a change in the duration of the flyback period whilst the simultaneous change in the inductance of the second inductor produces a change in the tuning of the odd harmonic to substantially ensure that the odd harmonic has the desired relationship with the flyback period.

As alternatives the second inductor may be connected in series with the primary winding of the transformer, or the secondary winding of the transformer generating the EHT supply or to any other winding of the transformer which is inductively tightly coupled to the primary winding.

BRIEF DESCRIPTION OF THE DRAWINGS

The above and other features of the present invention will be more readily understood from the following description with reference to the accompanying drawings, in which:

FIG. 2 shows waveforms associated with the circuit of FIG. 1.

DESCRIPTION OF THE PREFERRED EMBODIMENTS

Figure 1:
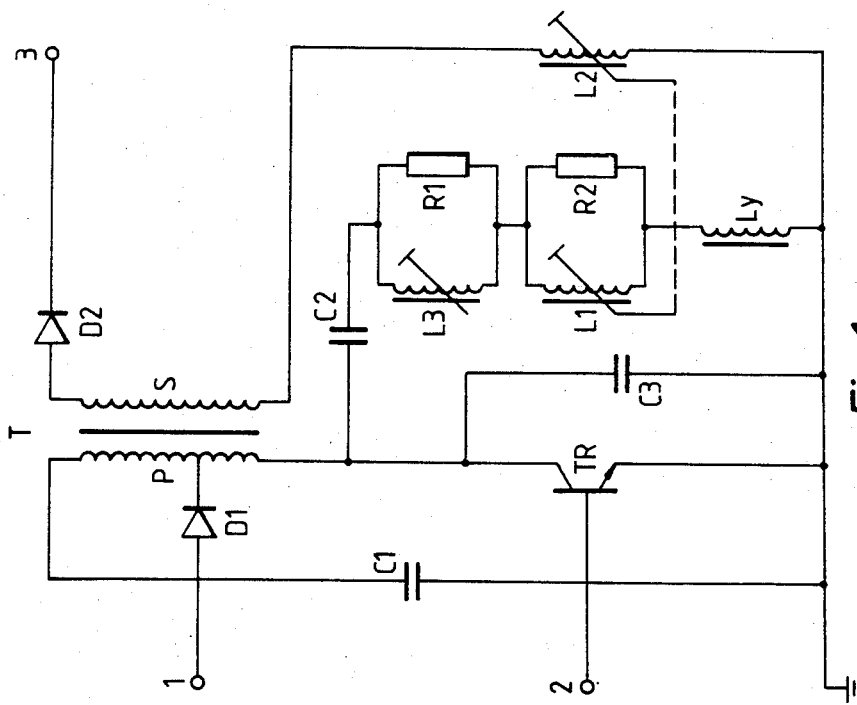
FIG. 1 is a circuit diagram of a line deflection circuit according to the invention.

In FIG. 1 a terminal 1 which carries +12V dc from a source whose negative terminal is connected to earth is connected through a diode D1 to the tap on the primary winding P of a line output transformer T. The upper end of the primary winding P is connected to a boost capacitor C1 whose other electrode is connected to earth whilst the lower end of primary winding P is connected to the collector of a npn transistor TR whose emitter is connected to earth. The base of transistor TR is connected to a terminal 2 which receives drive pulses at line frequency which are such that the transistor is rendered forward conducting sometime before the middle of the line scan period but is cut-off at the end of the scan period to initiate the flyback period in known manner. The collector of transistor TR is also connected through a trace capacitor C2, which also functions as the 'S' correction capacitor, to a parellel circuit comprising a pre-set linearity correction inductor L3 in parallel with a resistor R1. The lower end of this parallel circuit is connected to a second parallel circuit comprising a pre-set width control inductor L1 in parallel with a resistor R2, the lower end of this further parallel network being connected through a line deflection coil Ly, for deflecting the beam or beams in the line direction in a cathode display tube (not shown), to earth. A flyback capacitor C3 is also connected in parallel with the emitter-collector path of transistor TR.

The transformer T has a secondary winding S whose upper end is connected through a diode D2 to an output terminal 3, the secondary winding S being a very high voltage winding used to produce a rectified EHT supply of the order of 13 kV at terminal 3 for application to the final anode of the cathode ray display tube, whose beam or beams are deflected by the line deflection coil Ly. The lower end of secondary winding S is connected through a pre-set inductor L2 to earth.

The operation will first be considered in the absence of preset inductor L2, thus with the lower end of secondary winding S directly connected to earth. The circuit is energised from the 12 volt supply via the diode D1 which together with primary winding P, capacitor C1 and transistor TR acts as a series efficiency flyback boosting circuit such that a boosted supply is produced across the primary winding P. This arrangement is necessary with such a low voltage supply to enable the deflection coils, which require an average voltage of approximately 50 volts at 25 kHz line frequency, to be directly driven from the junction of the collector of transistor TR with the primary winding P. The boosted supply voltage which is the DC voltage across the boost capacitor C1 is the average voltage at the collector of transistor TR. At the start of the scan period the energy stored in the deflection coil Ly immediately after the flyback period causes a current to flow through the transistor TR, which initially conducts in the reverse direction, the two parallel circuits comprising inductors L3, L1 and their respective parallel resistors, R1, R2 and the line deflection coil Ly such that a sawtooth shaped scan current initially of negative polarity flows through the deflection coil Ly. If the transistor TR is of a type which is unable to conduct in the reverse direction then a suitably poled diode will need to be connected in parallel with the collector-emitter path of this transistor in known manner. At some time prior to the centre of the scan period a drive pulse is applied to the transistor base TR such that when the polarity of the sawtooth deflection current reverses it flows through transistor TR in the forward direction, the time at which transistor TR is rendered conducting also being determined by the need to supply energy to the circuit from the supply at terminal 1 when the diode D1 also conducts. The inductor L3 is as previously stated the linearity control inductor by means of which the linearity of the line scan across the display tube is achieved whilst the inductor L1 forms the width control to control the width of the line scan across the display tube. With data graphic displays the width of the line scan may be arranged to be such that it can just scan the edge-to-edge width of the display whilst on other occasions the width of the scan may be arranged to be less than or greater than the width of the display to respectively produce under or over-scan. At the end of the scan period transistor TR is cut-off to initiate the flyback period under the control of the inductance in the circuit and the capacitance in the circuit including that of the flyback capacitor C3 in known manner. The lower end of the primary winding P which was previously connected to earth through transistor TR is now disconnected therefrom and a half sinewave occupying the flyback period is set-up across the primary winding P to produce a high peak voltage thereacross which is transformed at the secondary winding S to produce the very high voltage for the EHT supply. The leakage inductance of the transformer T together with the associated transformer capacitances are tuned to an odd harmonic (normally third or fifth) of the above fundamental of which the flyback period forms a half-period to optimise the EHT supply with regard to regulation and ringing performance in known manner. When such a circuit is operating at line deflection frequencies higher than 15kHz and short flyback periods, e.g. 6 microsecond for deflection frequencies 25–30 kHz, variations in the inductance of the width control L1 will affect the effective inductance at the primary side of the transformer such that the circuit will not be tuned as required which can cause a worsening of the regulation of the EHT supply and an increase in the ringing following flyback during the start of the scan period which can cause vertical bars to be visible on the side of the display at which scan is initiated. With an increase of the inductance of width control inductor L1 the effective inductance at the primary side will be increased to produce an increase in the flyback period whilst a reduction of the the inductance of the width control inductor L1 will decrease the effective inductance to produce a decrease in the flyback period. However, changes in inductance of the width control inductor L1 will have substantially no effect on the above described tuning to the frequency of what should be the odd harmonic which will worsen EHT supply regulation due to the change in duration of the flyback period. FIG. 2A shows in continuous line the voltage at the collector of transistor TR during the flyback period when the circuit is tuned such that this period is of the desired duration and is also correctly tuned to its third harmonic which is shown in broken line. In such a case the second hump b should be typically 15% lower than the first hump a. FIG. 2B shows the voltage across the secondary winding S during the flyback period and part of the scan period for such a condition and where the magnitude of the ringing voltage V2 produced at the start of the scan period is within 15% of the peak-to-peak voltage V1 during the flyback period which has been found to produce a display where such vertical bars are not visible. If the fundamental frequency of the circuit is changed by a change in inductance of the width control inductor L1 such that the flyback period is not of the desired duration the previously desired third harmonic tuning will be of incorrect frequency. Such a situation is shown in continuous line in either FIG. 2C where the flyback period is increased or FIG. 2D where the flyback period is reduced, the third harmonic for the condition pertaining to FIG. 2A again being shown in broken line in FIGS. 2C and 2D. The voltage across the secondary winding S corresponding to the condition shown in FIG. 2C is shown in FIG. 2E where it will be seen that the peak-to-peak voltage V1' of the flyback period is reduced compared with the corresponding voltage V1 in FIG. 2B whilst the ringing voltage V2' is greater than the typical value of 15% of the peak-to-peak voltage V1'. The EHT supply thus produced by the secondary winding S will be reduced compared with the correctly tuned situation whilst the ringing voltage V2' will result in the above described modulation of the display. FIG. 2F shows the voltage across the second winding S corresponding to the condition shown in FIG. 2D and where the effect will be similar to that for FIG. 2E. Where it is aimed to reduce the scan width by an increase in the inductance of the width control inductor L1 the consequent fall in EHT supply would tend to increase the scan width thereby offsetting to some degree the effect of width control inductor L1. Due to the natureand construction of the linearity control inductor L3 any adjustment of this control will have substantially no effect on the above described changes in tuning.

With the circuit of FIG. 1 this is overcome by the presence of the inductor L2 whose inductance alters the leakage inductance of the transformer T, the inductors L1 and L2 having their pre-set adjustments mechanically linked or ganged such that as the inductance of width control inductor L1 is increased (which increases the inductance at the primary side of the transformer) the inductance of inductor L2 is also increased to increase the leakage inductance, or vice versa, and hence alter the tuning such that it corresponds with the required odd harmonic appropriate to the altered flyback period. This ensures that the relationship between flyback period and the required odd harmonic as shown in FIG. 2A in substantially restored (even though the duration of the flyback period has changed) whilst the peak-to-peak voltage V1 at the secondary winding S during the flyback period will be substantially restored to the value shown in FIG. 2B and the ringing voltage V2 reduced to the acceptable level such that the above described modulation will not be visible. In addition the offsetting effect of the change in EHT supply on the scan width will be substantially overcome and thus a smaller increase in the inductance of the width control inductor L1 will be required to reduce scan width in presence of inductor L2 than without it.

Instead of connecting the lower end of inductor L2 to earth it could alternately be connected to a tap on the primary winding P of transformer T such as is shown in FIG. 2 of UK Patent Specification No. 1 251 355, or to any other secondary winding on transformer T. As an alternative, the inductor L2 may be connected to any winding of the transformer T other than the primary P or EHT secondary S winding which is tightly coupled to the primary winding.

Figure 3:
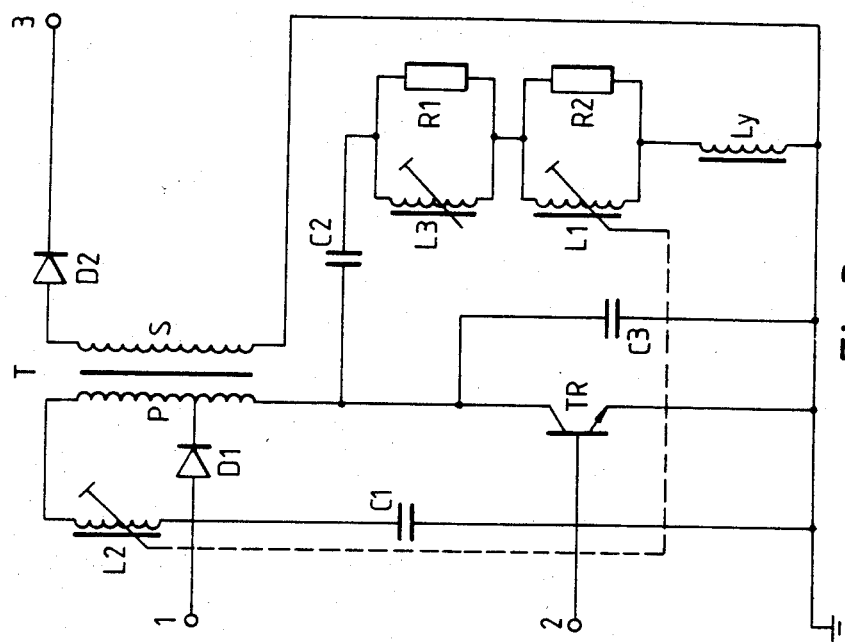
FIG. 3 is a modification of the line deflection circuit shown in FIG. 1.

FIG. 3 shows a modification of the circuit shown in FIG. 1 were like references are used for like components. The differences between FIG. 3 and FIG. 1 are that the lower end of the secondary winding S is connected to earth whilst the inductor L2 is included between the upper end of the primary winding P and the capacitor C1, the adjustment means of the inductor L2 again being mechanically coupled to the adjustment means of inductor L1 and arranged such that as the inductance of width control inductor L1 is increased the inductance of inductor L2 is also increased, and vice versa. In FIG. 3 changes in inductance of inductor L2 again alters the leakage inductance in transformer T and the operation is the same as that for FIG. 1.

In a practical embodiment of FIG. 1 designed to operate within a line frequency range of 23 kHz to 30 kHz with a line flyback period of about 6 microseconds the following components were used.

| R1 | 470 ohms | D1 | located in transformer T |
|---|---|---|---|
| R2 | 470 ohms | D2 | BYW 95B - (Philips) |
| C1 | 47 μF in parallel with 0.1 μF | TR | BU 826A - (Philips) |
| | | Ly | AT 1077 - (Philips) |
| C2 | 1.0 μF (at 23 kHz) 0.68 μF (at 30 kHz) | L3 | AT 4042/42 - (Philips) (30 to 65 μH). |
| C3 | 3.9 nF | T | AT 2240 type for nominal 25 kHz operation - (Philips) |

L1 and L2 were formed from a modified width control AT 4044/39—(Philips) with L2 being wound within the spare flanges on that component. The inductance values were:

| L1 | 17 to 47 μH |
|---|---|
| L2 | 2.5 to 6.5 mH |

Simultaneous adjustment of the inductances of L1 and L2 was performed by a specially constructed core comprising two ferrite sections spaced by a non-magnetic spacer.

In the embodiments described above in relation to FIGS. 1 and 3 the circuits are energised from a low voltage supply (12 volts) and the required operating voltage across the primary winding P of the transformer T produced by the series efficiency flyback boosting circuit. However, it will be appreciated that the invention may be used with other forms of line deflection circuit such as where the required high voltage across the primary winding is applied directly thereto from a convenient high voltage supply.

What is claimed is:

1. A line output circuit for generating a line frequency sawtooth current having a scan period and a flyback period through a line deflection coil for deflecting an electron beam in a cathode ray display tube, said circuit comprising the series arrangement of a line deflection coil and a trace capacitor which series arrangement is connected across the terminals of a controlled switch, a flyback capacitor also being connected across the terminals of said controlled switch, one terminal of the controlled switch being additionally connected to the primary winding of a transformer which winding is additionally connected to a supply terminal for a source of direct voltage, said transformer having a secondary winding one end of which is connected to a rectifier for generating, during the flyback period, the EHT supply for the final anode of a display tube, the circuit being tuned during the flyback period to a fundamental frequency and an odd harmonic thereof with the flyback period substantially corresponding to the duration of a half-cycle at the fundamental frequency, said controlled switch being conducting during the scan period and being rendered non-conducting at the end of the scan period to initiate the flyback period, characterised in that said circuit additionally comprises a first variable inductor included in said series arrangement for varying the width of the line scan on display and a second variable inductor connected in series with a winding of said transformer, the adjustment providing a variation in the inductance of said first inductor being ganged with that for the second conductor and arranged such that as the inductance of the first inductor is increased, the inductance of the second inductor is also increased and vice versa, whereby an alteration in the desired relationship between the said odd harmonic and the flyback period produced by a change in the inductance of said first inductor is substantially compensated for by the simultaneous change in the inductance of said second inductor.

2. A line output circuit as claimed in claim 1, characterised in that said second inductor is connected between the said winding of the transformer and either a point of reference potential or a tap on another winding on said transformer, a variation in the inductance of the second inductor varying the leakage inductance of the transformer, a change in the inductance of the first inductor producing a change in the duration of the flyback period whilst the simultaneous change in the inductance of the second inductor produces a change in the tuning of the odd harmonic to substantially ensure that the odd harmonic has the desired relationship with the flyback period.

3. A line output circuit as claimed in claim 1, characterised in that the said winding of the transformer is the primary winding.

4. A line output circuit as claimed in claim 1, characterised in that the said winding of the transformer is the secondary winding generating the EHT supply.

5. A line output circuit as claimed in claim 1, characterised in that the said winding of the transformer is a winding which is inductively tightly coupled to the primary winding.

* * * * *